(12) United States Patent
Roimela et al.

(10) Patent No.: US 9,898,486 B2
(45) Date of Patent: Feb. 20, 2018

(54) METHOD, A SYSTEM, AN APPARATUS AND A COMPUTER PROGRAM PRODUCT FOR IMAGE-BASED RETRIEVAL

(71) Applicant: Nokia Technologies Oy, Espoo (FI)

(72) Inventors: Kimmo Roimela, Tampere (FI); Lixin Fan, Tampere (FI)

(73) Assignee: Nokia Technologies Oy, Espoo (FI)

( * ) Notice: Subject to any disclaimer, the term of this patent is extended or adjusted under 35 U.S.C. 154(b) by 144 days.

(21) Appl. No.: 15/018,998

(22) Filed: Feb. 9, 2016

(65) Prior Publication Data

US 2016/0239518 A1 Aug. 18, 2016

(30) Foreign Application Priority Data

Feb. 12, 2015 (GB) .................................. 1502299.9

(51) Int. Cl.
*G06K 9/00* (2006.01)
*G06F 17/30* (2006.01)
*G06K 9/46* (2006.01)
*G06K 9/62* (2006.01)

(52) U.S. Cl.
CPC ..... *G06F 17/30247* (2013.01); *G06K 9/4642* (2013.01); *G06K 9/6202* (2013.01)

(58) Field of Classification Search
CPC ........ G06F 17/30247; G06F 17/30256; G06K 9/6215; G06K 9/6201; G06K 9/52; G06K 9/6202; G06K 9/4642; G06K 9/4676; G06T 7/0042
See application file for complete search history.

(56) References Cited

U.S. PATENT DOCUMENTS

| 6,691,126 | B1 | 2/2004 | Syeda Mahmood |
| 8,189,964 | B2 | 5/2012 | Flynn et al. |
| 8,290,305 | B2 | 10/2012 | Minear et al. |
| 8,483,519 | B2 | 7/2013 | Frank et al. |
| 2005/0190972 | A1 | 9/2005 | Thomas et al. |
| 2007/0070069 | A1 | 3/2007 | Samarasekera et al. |

(Continued)

FOREIGN PATENT DOCUMENTS

| CN | 102053249 A | 5/2011 |
| CN | 103294676 A | 9/2013 |

(Continued)

OTHER PUBLICATIONS

"Fast Binary Feature-Based Localization in Urban Environment", Computer Vision and Pattern Recognition, 2013, pp. 1-8.

(Continued)

*Primary Examiner* — Yon Couso
(74) *Attorney, Agent, or Firm* — Nokia Technologies Oy (57) ABSTRACT

The invention relates to a method and a system for image-based retrieval. The method comprises receiving a query image; processing the query image to obtain visual features; determining a feature from the obtained visual features; determining a viewing direction for the query image from a pre-determined set of viewing directions; generating a direction-based hash based on the determined feature in the query image and the viewing direction; identifying sub-volumes of a point cloud database that match the direction-based hash; and matching the identified sub-volumes against all the query image features to find a match.

14 Claims, 6 Drawing Sheets

(56) References Cited

U.S. PATENT DOCUMENTS

| | | | |
|---|---|---|---|
| 2011/0150320 A1 | 6/2011 | Ramalingam et al. | |
| 2013/0254191 A1* | 9/2013 | He | G06F 17/3053 707/728 |
| 2014/0016821 A1 | 1/2014 | Arth et al. | |
| 2015/0049943 A1* | 2/2015 | Hamsici | G06K 9/4609 382/170 |
| 2015/0169644 A1 | 6/2015 | Gong et al. | |

FOREIGN PATENT DOCUMENTS

| | | |
|---|---|---|
| CN | 103412960 A | 11/2013 |
| WO | 2011/048497 A2 | 4/2011 |

OTHER PUBLICATIONS

Zhang et al., "Image Based Localization in Urban Environments", Proceedings of the Third International Symposium on 3D Data Processing, Visualization, and Transmission, Jun. 14-16, 2006, pp. 1-8.

Schindler et al., "City-Scale Location Recognition", International Conference on Comptuer Vision and Pattern Recognition, Jun. 2007, 7 pages.

Hays et al., "IM2GPS: Estimating Geographic Information From a Single Image", Proceedings of the IEEE Conf. on Computer Vision and Pattern Recognition, Jun. 2008, 8 pages.

Avrithis et al., "Retrieving Landmark and Non-Landmark Images From Community Photo Collections", Proceedings of the 18th ACM international conference on Multimedia, Oct. 25-29, 2010, pp. 153-162.

Sattler et al., "Image Retrieval for Image-Based Localization Revisited", British Machine Vision Conference, 2012, pp. 1-12.

Li et al., "Worldwide Pose Estimation Using 3d Point Clouds", European Conference on Computer Vision, 2012, pp. 1-14.

Nister et al., "Scalable Recognition With a Vocabulary Tree", Proceedings of the 2006 IEEE Computer Society Conference on Computer Vision and Pattern Recognition—vol. 2, 2006, 8 pages.

Irschara et al., "From Structure-From-Motion Point Clouds to Fast Location Recognition", IEEE Computer Society Conference on Computer Vision and Pattern Recognition Workshops, 2009, 8 pages.

Fischler et al., "Random Sample Consensus: A Paradigm for Model Fitting With Applications to Image Analysis and Automated Cartography", Magazine Communications of the ACM, vol. 24, No. 6, Jun. 1981, pp. 381-395.

Lepetit et al., "EPnP: An Accurate O(n) Solution to the PnP Problem", International Journal of Computer Vision, vol. 81, Feb. 2009, 12 pages.

Sattler et al., "Fast Image-Based Localization Using Direct 2D-to-3D Matching", Proceedings of the IEEE International Conference on Computer Vision, Nov. 6-13, 2011, 8 pages.

Li et al., "Location Recognition Using Prioritized Feature Matching", Proceedings of the 11th European conference on Computer vision: Part II, 2010, pp. 1-14.

Lim et al., "Real-Time Image-Based 6-DOF Localization in Large-Scale Environments", Proceedings of the 2012 IEEE conference on Computer Vision and Pattern Recognition, Jun. 16-21, 2012, 8 pages.

Straub, "Visual Localization Based on Binary Features", Thesis, 2012, 86 pages.

Lepetit et al., "Real-Time 3D Tracking in Monocular Sequences", Computer aided medical procesures and augmented reality, Feb. 2007, 1 page.

Calonder et al., "BRIEF: Computing a Local Binary Descriptor Very Fast", IEEE Transactions on Pattern Analysis and Machine Intelligence, vol. 34, No. 7, Jul. 2012, pp. 1281-1298.

International Search Report and Written Opinion received for corresponding Patent Cooperation Treaty Application No. PCT/CN2013/073225, dated Jan. 9, 2014, 10 pages.

Dubewar et al., "Query Adaptive Image Retrieval System", Int. Journal of Engineering Research and Applications, vol. 1, No. 3, Version 1, Mar. 2014, pp. 935-938.

Search Report received for corresponding United Kingdom Patent Application No. 1502299.9, dated Jul. 17, 2015, 3 pages.

Stein et al., "Efficient Two Dimensional Object Recognition", 10th International Conference on Pattern Recognition, vol. 1, 1990, pp. 13-17.

Extended European Search Report received for corresponding European Patent Application No. 13880055.2, dated Sep. 8, 2016, 7 pages.

Muja et al., "Fast Matching of Binary Features", Proceedings of the 2012 Ninth Conference on Computer and Robot Vision, 2012, 7 pages.

Calonder et al., "BRIEF: Binary Robust Independent Elementary Features", Proceedings of the 11th European conference on Computer vision: Part IV, 2010, pp. 1-14.

Rublee et al., "ORB: An Efficient Alternative to SIFT or SURF", Proceedings of the 2011 International Conference on Computer Vision, Nov. 6-13, 2011, 8 pages.

Strecha et al., "LDAHash: Improved Matching With Smaller Descriptors", IEEE Transactions on Pattern Analysis and Machine Intelligence, vol. 34, No. 1, Jan. 2012, pp. 66-78.

* cited by examiner

METHOD, A SYSTEM, AN APPARATUS AND A COMPUTER PROGRAM PRODUCT FOR IMAGE-BASED RETRIEVAL

TECHNICAL FIELD

Various embodiments relate generally to a method, a system, an apparatus and a computer program product for image-based retrieval.

BACKGROUND

In an image-based retrieval system, a query image is used for retrieving image related data, for example a position of a camera, from a server. The image is processed (either in a server or in a client apparatus) to extract visual features (e.g. SIFT (Scale Invariant Feature Transform) features or other similar descriptors derived from the local neighborhood of any given point in the image), which visual features are then submitted to the image-based retrieval system. The retrieval system tries to match the visual features against known, previously identified and localized visual features. If a match is found, a visual location (or other associated data, e.g. position) corresponding to the query image is returned to the client apparatus for further use.

The search space in the retrieval system can be huge, especially for the real-world applications. When reconstructing a 3D point cloud of a shopping mall, there are millions of or even more feature vectors, against which the thousands of features from the query image must be compared.

There is, therefore, a need for a solution that accelerates the image-based retrieval in the context of visual location determination.

SUMMARY

Now there has been described a method and a system for implementing the method. Various embodiments of the invention include a method, an apparatus, a server, a client and a computer readable medium comprising a computer program stored therein, which are characterized by what is stated in the independent claims. Various embodiments of the invention are disclosed in the dependent claims.

According to a first embodiment, there is provided a method comprising receiving a query image; processing the query image to obtain visual features; determining a feature from the obtained visual features; determining a viewing direction for the query image from a pre-determined set of viewing directions; generating a direction-based hash based on the determined feature in the query image and the viewing direction; identifying sub-volumes of a point cloud database that match the direction-based hash; and matching the identified sub-volumes against all the query image features to find a match.

According to a second embodiment, there is provided an apparatus comprising at least one processor, memory including computer program code, the memory and the computer program code configured to, with the at least one processor, cause the apparatus to perform at least the following: to receive a query image; to process the query image to obtain visual features; to determine a feature from the obtained visual features; to determine a viewing direction for the query image from a pre-determined set of viewing directions; to generate a direction-based hash based on the determined feature in the query image and the viewing direction; to identify sub-volumes of a point cloud database that match the direction-based hash; and to match the identified sub-volumes against all the query image features to find a match.

According to a third embodiment, there is provided an apparatus comprising at least processing means and memory means, and further comprising means for receiving a query image; means for processing the query image to obtain visual features; means for determining a feature from the obtained visual features; means for determining a viewing direction for the query image from a pre-determined set of viewing directions; means for generating a direction-based hash based on the determined feature in the query image and the viewing direction; means for identifying sub-volumes of a point cloud database that match the direction-based hash; and means for matching the identified sub-volumes against all the query image features to find a match.

According to a fourth embodiment, there is provided a system comprising at least one processor, memory including computer program code, the memory and the computer program code configured to, with the at least one processor, cause the system to perform at least the following: to receive a query image; to process the query image to obtain visual features; to determine a feature from the obtained visual features; to determine a viewing direction for the query image from a pre-determined set of viewing directions; to generate a direction-based hash based on the determined feature in the query image and the viewing direction; to identify sub-volumes of a point cloud database that match the direction-based hash; and to match the identified sub-volumes against all the query image features to find a match.

According to a fifth embodiment, there is provided a computer program product embodied on a non-transitory computer readable medium, comprising computer program code configured to, when executed on at least one processor, cause an apparatus or a system to receive a query image; to process the query image to obtain visual features; to determine a feature from the obtained visual features; to determine a viewing direction for the query image from a pre-determined set of viewing directions; to generate a direction-based hash based on the determined feature in the query image and the viewing direction; to identify sub-volumes of a point cloud database that match the direction-based hash; and to match the identified sub-volumes against all the query image features to find a match.

According to an embodiment, the viewing direction is predetermined viewing direction closest to the estimated viewing direction of the query image.

According to an embodiment, the determined feature is a strongest feature of the obtained features.

According to an embodiment, a location data relating to the query image is determined based on a match, and the location data is output.

According to an embodiment, if a match is not found, a neighboring viewing direction of the viewing direction is set to be the viewing direction.

According to an embodiment, the viewing direction of the query image is estimated based on sensor data.

According to an embodiment, the point cloud database comprises a full point data cloud being divided into sub-volumes, wherein a sub-volume comprises a direction-based hash for each viewing direction.

According to an embodiment, the direction-based hash is generated by determining a quality metric for each feature within a viewing direction; determining a strongest feature in said viewing direction by means of determined quality metrics; generating a hash for the strongest feature; and combining the generated hash with said viewing direction to generate a direction-based hash.

DESCRIPTION OF THE DRAWINGS

In the following, various embodiments of the invention will be described in more detail with reference to the appended drawings, in which.

DESCRIPTION OF EXAMPLE EMBODIMENTS

Figure 1:
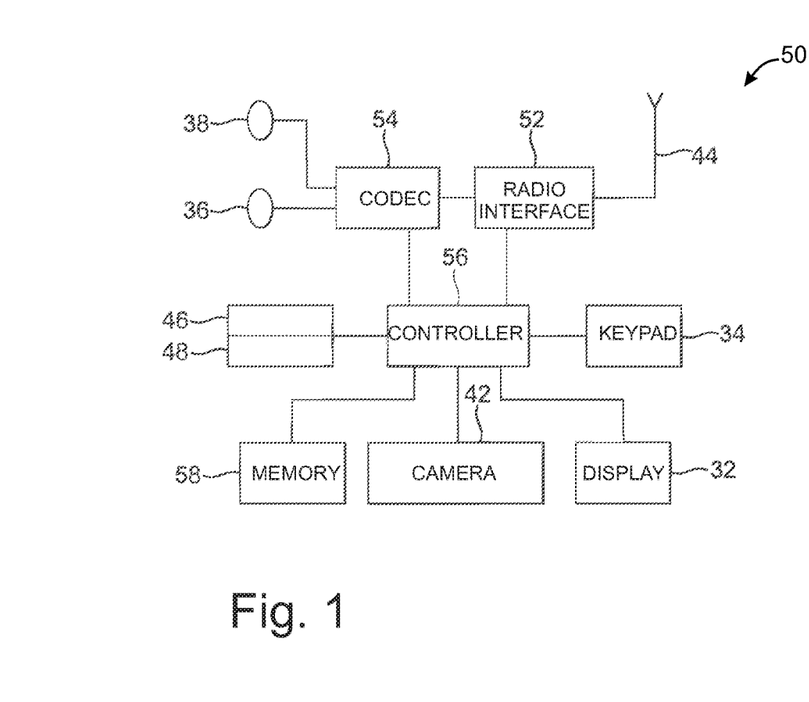
FIG. 1 shows an embodiment of an apparatus.
Figure 2:
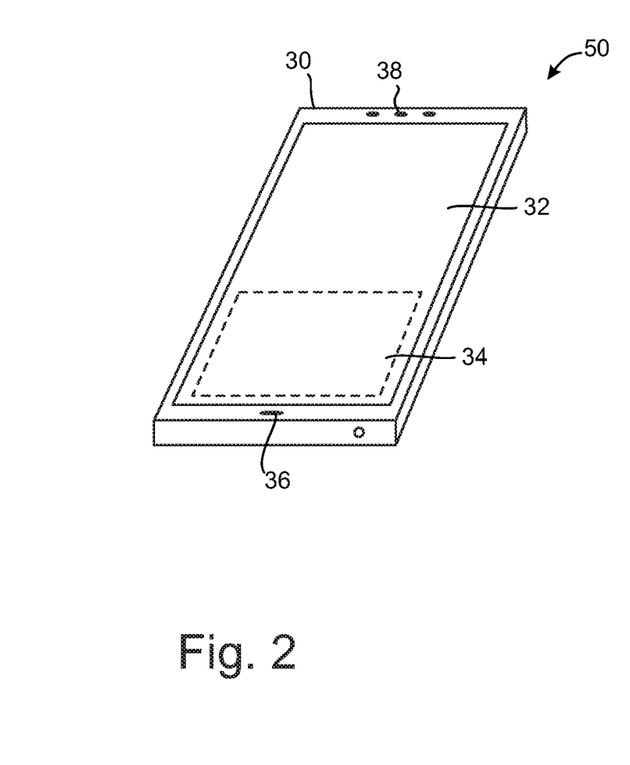
FIG. 2 shows an embodiment of a layout of an apparatus.

FIGS. 1 and 2 illustrate an apparatus according to an embodiment. The apparatus 50 is an electronic device for example a mobile terminal or a user equipment of a wireless communication system or a camera device. The embodiments disclosed in this application can be implemented within any electronic device or apparatus which is able to capture digital images, such as still images and/or video images, and is connectable to a network. The apparatus 50 may comprise a housing 30 for incorporating and protecting the device. The apparatus 50 further may comprise a display 32, for example, a liquid crystal display or any other display technology capable of displaying images and/or videos. The apparatus 50 may further comprise a keypad 34. According to another embodiment, any suitable data or user interface mechanism may be employed. For example, the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device, which may be any of the following: an earpiece 38, a speaker or an analogue audio or digital audio output connection. The apparatus 50 may also comprise a battery (according to another embodiment, the device may be powered by any suitable mobile energy device, such as solar cell, fuel cell or clockwork generator). The apparatus may comprise a camera 42 capable of recording or capturing images and/or video, or may be connected to one. According to an embodiment, the apparatus 50 may further comprise an infrared port for short range line of sight communication to other devices. According to an embodiment, the apparatus 50 may further comprise any suitable short range communication solution such as for example a Bluetooth wireless connection or a USB/firewire wired solution.

The apparatus 50 may comprise a controller 56 or processor for controlling the apparatus. The controller 56 may be connected to memory 58 which, according to an embodiment, may store both data in the form of image and audio data and/or may also store instructions for implementation on the controller 56. The controller 56 may further be connected to codec circuitry 54 suitable for carrying out coding and decoding or audio and/or video data or assisting in coding and decoding carried out by the controller 56.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

According to an embodiment, the apparatus 50 comprises a camera 42 capable of recording or detecting individual frames which are then passed to the codec 54 or controller for processing. According to an embodiment, the apparatus may receive the video image data for processing from another device prior to transmission and/or storage. According to an embodiment, the apparatus 50 may receive the images for processing either wirelessly or by a wired connection.

Figure 3:
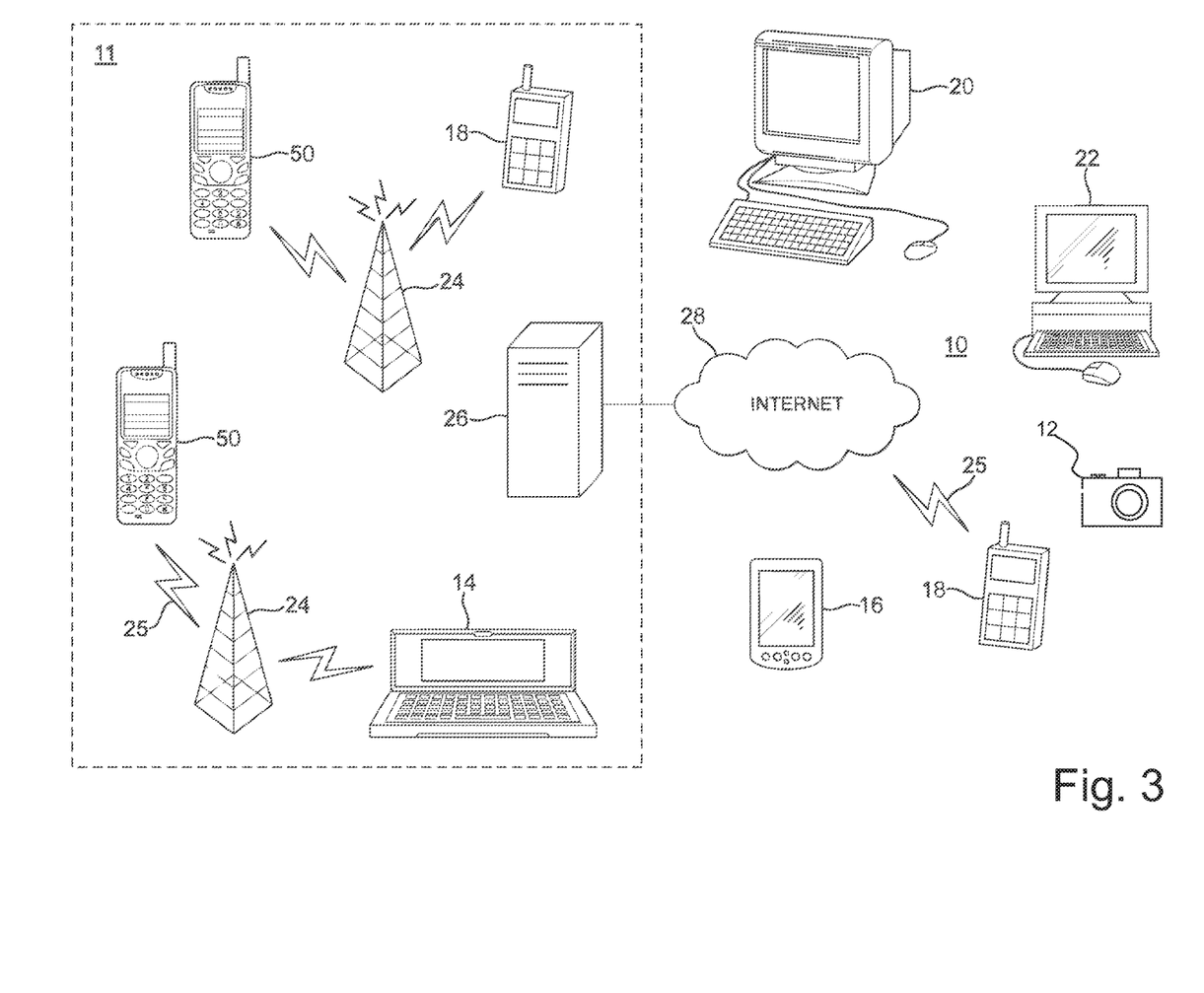
FIG. 3 shows an embodiment of a system.

FIG. 3 shows a system configuration comprising a plurality of apparatuses, networks and network elements according to an embodiment. The system 10 comprises multiple communication devices which can communicate through one or more networks. The system 10 may comprise any combination of wired or wireless networks including, but not limited to a wireless cellular telephone network (such as a GSM, UMTS, CDMA network, etc.), a wireless local area network (WLAN), such as defined by any of the IEEE 802.x standards, a Bluetooth personal area network, an Ethernet local area network, a token ring local area network, a wide area network, and the internet.

The system 10 may include both wired and wireless communication devices or apparatus 50 suitable for implementing present embodiments. For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include but are not limited to, an electronic device or apparatus 50, a combination of a personal digital assistant (PDA) and a mobile telephone 14, a PDA 16, an integrated messaging device (IMD) 18, a desktop computer 20, a notebook computer 22, a digital camera 12. The apparatus 50 may be stationary or mobile when carried by an individual who is moving. The apparatus 50 may also be located in a mode of transport.

Some of further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telephone system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio infrared, laser, cable connections or any suitable connection.

Figure 4:
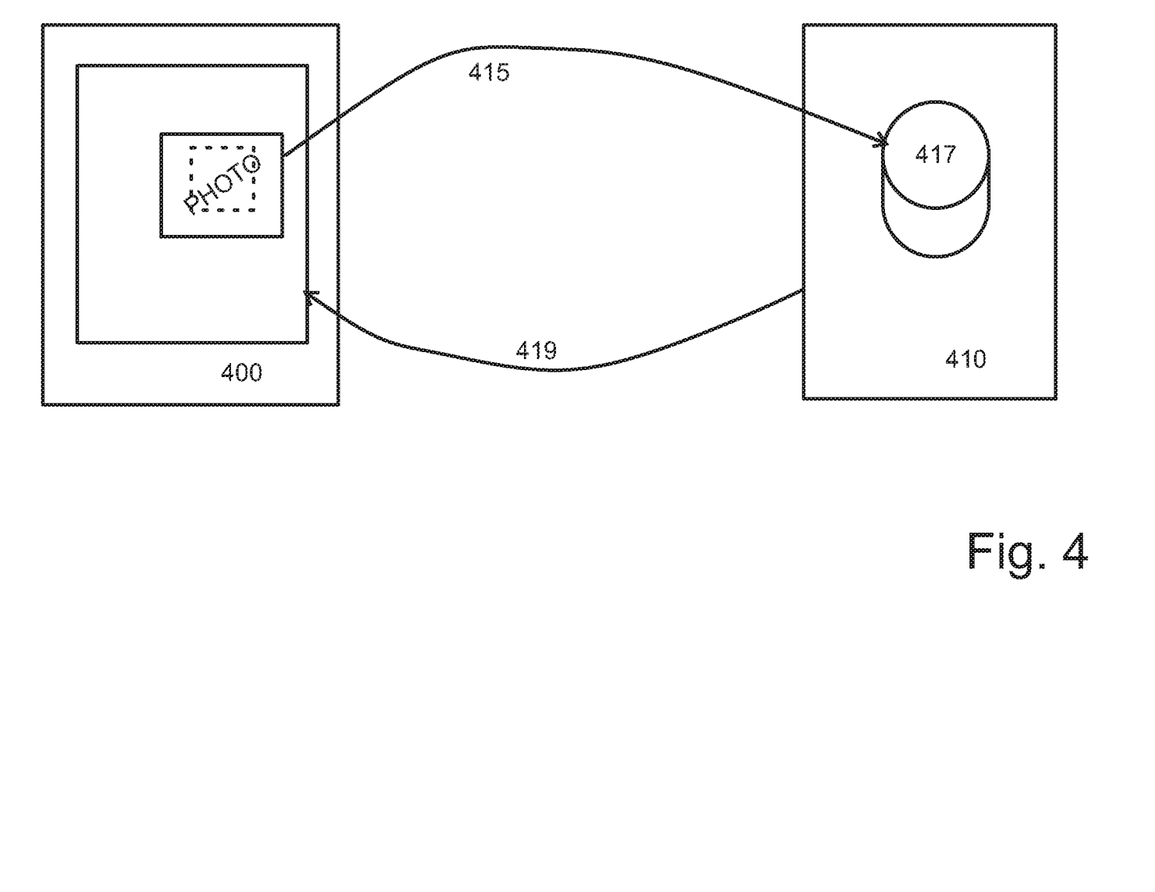
FIG. 4 shows an embodiment of an image retrieving.

FIG. 4 illustrates in a simplified manner an image retrieval, in accordance with an embodiment. In FIG. 4, a camera 400 uploads an image to a server 410 through a communication network 415. The image is used to query the database 417 on the server. Image related data, e.g. visual location, is then recovered by the server 410 and returned 419 back to the camera to be used for different applications. For the purposes of the present example, term "image" is used to refer to an image file containing visual content being captured of a scene. The image is a still image or still shot (i.e. a frame) of a video stream.

There are methods for hashing of (binary or vector) image features. Known methods adopt visual keywords clustering approach to cluster similar database features into multiple subsets (i.e. buckets) that are close to each other, and subsequently, fast feature matching is achieved by restricting the linear matching process to similar buckets only. However, such methods does not take into account camera orientations measured by device sensors (such as e.g. compass), and thus is not able to utilize this information.

The present embodiments propose simplifying the search in image-based retrieval by creating hashes corresponding to sub-spaces inside the full search space (i.e. full point cloud, e.g. a building). The hashes are created out of the most prominent feature(s) visible from each sub-space in a small subset of fixed viewing directions. Then, the most prominent feature(s) of the query image can be identified and combined with the viewing direction of the query image to produce a query hash that is used to narrow down the search to a small subset of sub-spaces.

Building a Point Cloud Database

According to an embodiment, the hashes for the point cloud database are built based on the following.

Figure 5:
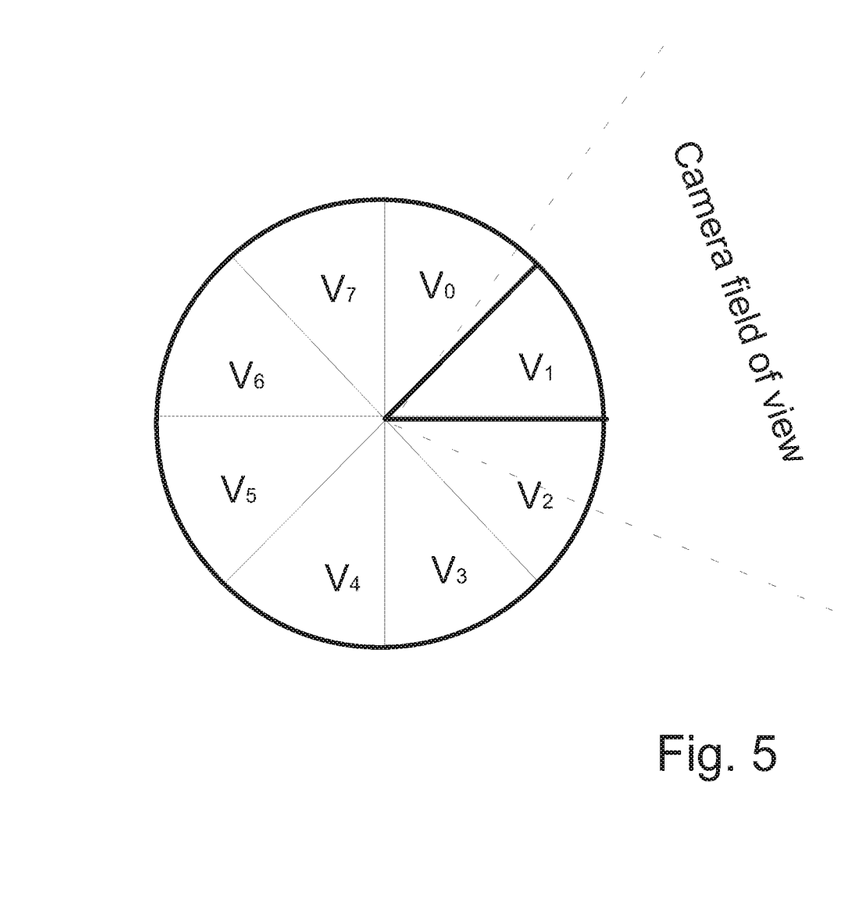
FIG. 5 shows an embodiment of mapping a camera view to viewing directions.

Then the hash creation proceeds as described next. The volume that is covered by the full point cloud (e.g. a complete building) is subdivided into small sub-volumes. The sub-volumes can be determined using any spatial subdivision scheme: for example, by dividing the full point cloud into a set of fixed-size cubes, or by applying binary space partitioning (BSP) so that each level splits the point cloud into two sub-trees containing an equal number of points until a suitable number of points per node is reached. A set of globally defined, fixed viewing directions $v_0, v_1, v_2, \ldots, v_N$ are determined for each sub-volume. FIG. 5 shows an example of dividing a circle into eight viewing directions, each with a corresponding cone of angles. In practice the division happens in 3D, for the 360° sphere of possible viewing directions. FIG. 5 shows eight directions $v_0, v_1, v_2, \ldots, v_7$, as an example.

Then for each sub-volume the following procedure is performed:

For each viewing direction $v_i$ within a sub-volume
  (i) A quality metric is determined for each feature within the cone of angles corresponding the viewing direction (e.g. $v_i$), which quality metric indicates how strong that feature is. It is then determined from a set of features, the strongest feature visible in that viewing direction by means of the determined quality metrics.
  (ii) A hash is generated for the strongest feature in that viewing direction.
  (iii) The generated hash is combined with the viewing direction to generate a new direction-based hash. The eight-direction ($v_0, v_1, v_2, \ldots, v_7$) example given above results in three "direction" bits that can be incorporated in the hash.
  (iv) The direction-based hash is stored for this sub-volume.

Optionally, all the sub-volumes sharing the same hashes are combined.

The above procedure results in N hashes per sub-volume, where N is the number of viewing directions used in the system. It is to be noted that each sub-volume may also have information about which features are visible from that sub-volume, effectively segmenting the full point cloud database into smaller point clouds.

Image Retrieval

Figure 6:
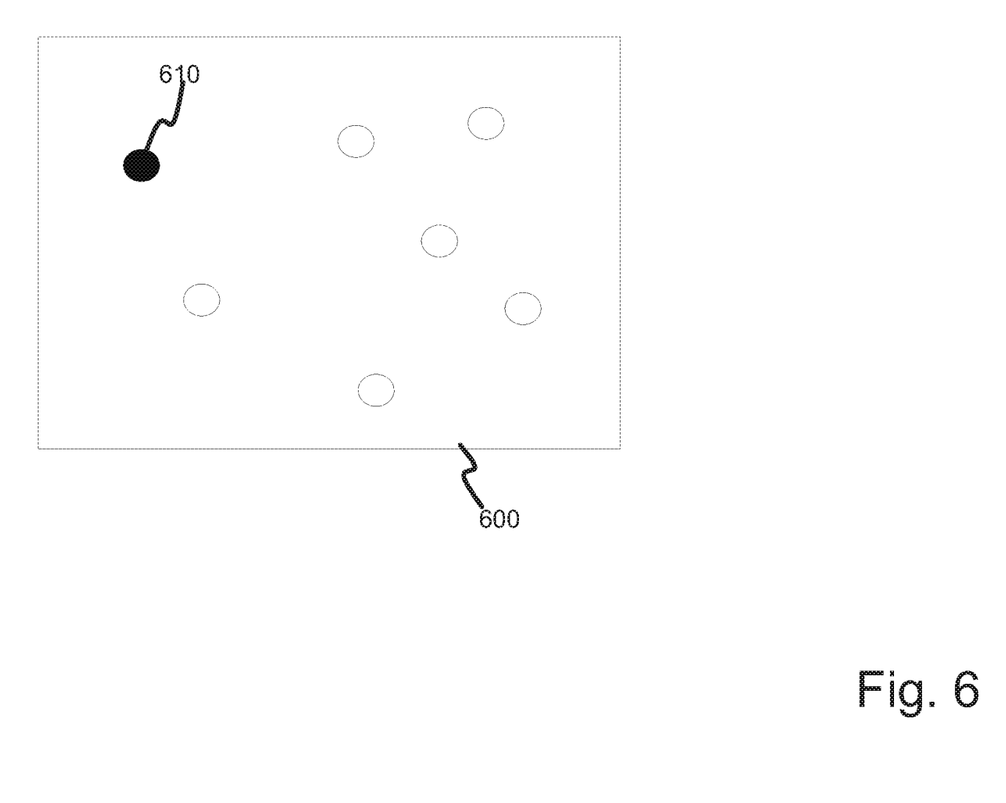
FIG. 6 shows an embodiment of identified features within a camera view.

When a query image is submitted to the retrieval system, the retrieval system is configured to determine a viewing direction $v_i$ for the query image, based on sensor data (i.e. yaw and/or pitch) of the imaging apparatus. According to an embodiment, the viewing direction is the closest viewing direction from a predefined set. For example, if a set of viewing directions include North, South, East, and West, it is possible to find the closest direction from the compass heading reported by the device. Alternatively, it is possible to have directions with a pitch of −90°, −45°, 0°, 45°, and 90°, for example, in which case the closest direction can be determined from the accelerometer data: a pitch of +30° would be closest to 45°, for example. In practice, each viewing direction could be represented as a yaw value, pitch value, or a combination thereof. The sensor data may be obtained from e.g. a compass, an accelerometer, a gyroscope, etc., and may be stored as a metadata of the query image. As shown in embodiment of FIG. 5, a viewing direction $v_1$ is determined as being the closest viewing direction for the query image. The closest viewing direction $v_1$ is determined from a pre-determined set of viewing directions ($v_0, v_1, v_2, \ldots, v_7$). The system is then configured to process the query image to obtain visual features. From the obtained visual features, the system is configured to identify a feature in the query image (as in A: step i). The identified feature can be the strongest feature from a set of visual features. The strongest feature is illustrated in FIG. 6 with a black dot 610 in the query image 600, or a camera view. The other dots represent identified other features.

Further, another direction-based hash is generated for the combination of the feature's (e.g. a strongest feature) feature vector and the viewing direction similarly to the procedure (A: iii) above. The system is then configured to search the point cloud database for a subset of all sub-volumes containing the resulting hash (i.e. another direction-based hash). The direction-based hash is thus used to quickly identify sub-volumes for full processing. The point clouds corresponding to the identified sub-volumes are then matched according to known image-based matching method against the full set of features extracted from the query image until a match is found. If there is a match between the query image features and the subset of features contained in the subset of sub-volumes, a visual location (as an example of image related data) for the query image is determined.

The retrieval system returns the visual location to the client apparatus. The visual location may relate to a position information of the imaging apparatus having captured the query image. The client apparatus may be also the imaging apparatus.

If the initial query fails, e.g. due to sensor inaccuracy to determine the initial viewing direction used for accelerating the query, the query can be extended to adjacent (i.e. neighboring) viewing directions (e.g. in $v_0$ or $v_2$ in FIG. 5), wherein the steps for finding a match are repeated. This means that a new direction-based hash is generated based on the determined strongest feature in the query image and the selected neighboring viewing direction. The sub-volumes of a point cloud database that match the direction-based hash are identified and the identified sub-volumes are matched against all the query image features to find a match.

Alternatively, if the initial query fails, the query can be implemented by using the second, the third, the fourth etc. strongest feature in the query image instead of the strongest feature. Such features can be used with either the closest viewing direction or a neighboring viewing direction, or any specified viewing direction.

According to embodiments, in a method for finding a visual location of a query images a) a query image is processed and visual features such as SIFT etc. are extracted; b) visual features of the query image are matched with those features already stored in the database; c) the camera location (as well as orientation) of the query image is found based on a number of obtained matches from step b).

For step a) each feature is extracted from a small region in the query image, that is to say, each feature is associated with a 2D image pixel position (i,j).

For step b) the matching speed can be greatly improved according to the present embodiments by using hash features based on viewing direction. Since features in the database may be actually associated with 3D points, the match between features provides information about correspondence between 2D image pixels (i,j) and 3D points (x,y,z). These correspondences can be thought as projection lines starting from the camera center to 3D points (x,y,z) passing through the image pixel (i,j).

For step c) the camera intrinsic parameters and a number of the correspondences (projection lines) are known, whereupon it is possible to find out the camera center location ($x_c$, $y_c$, $z_c$) as well as the orientation (e.g. yaw, pitch, roll) of the camera.

Figure 7:
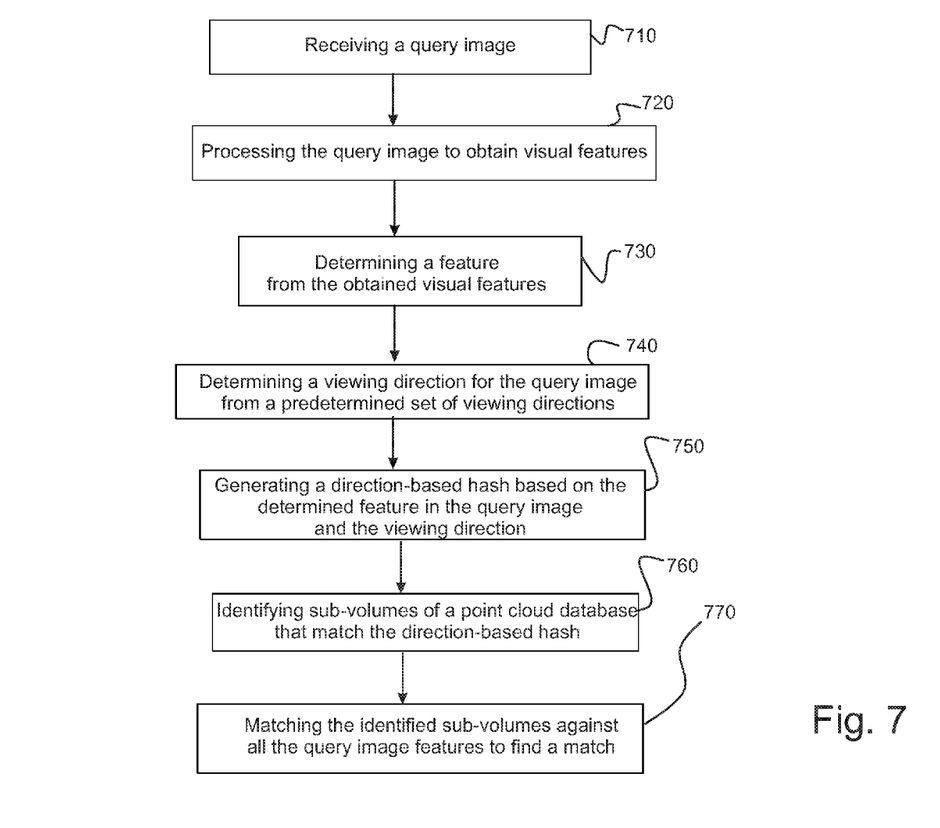
FIG. 7 is a flowchart for a method according to an embodiment.

FIG. 7 illustrates a method according to an embodiment as a flowchart. The method comprises receiving a query image 710; processing the query image to obtain visual features 720; determining a feature from the obtained visual features 730; determining a viewing direction for the query image from a pre-determined set of viewing directions 740; generating a direction-based hash based on the determined feature in the query image and the viewing direction 750; identifying sub-volumes of a point cloud database that match the direction-based hash 760; and matching the identified sub-volumes against all the query image features to find a match 770.

The various embodiments may provide advantages. The present embodiments enables significant acceleration of image-based retrieval in the context of visual location determination. This enhances applications such as identifying locations based on photographs, or bootstrapping visual tracking for an augmented reality device.

The various embodiments of the invention can be implemented with the help of computer program code that resides in a memory and causes the relevant apparatuses to carry out the invention. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment.

It is obvious that the present invention is not limited solely to the above-presented embodiments, but it can be modified within the scope of the appended claims.

The invention claimed is:

1. A method, comprising:
receiving a query image;
processing the query image to obtain visual features;
determining a feature from the visual features obtained by processing the query image;
determining a viewing direction for the query image from a pre-determined set of viewing directions, wherein the viewing direction is predetermined viewing direction closest to an estimated viewing direction of the query image, and wherein the viewing direction of the query image is estimated based on sensor data;
generating a direction-based hash based on the feature in the query image and the viewing direction;
identifying sub-volumes of a point cloud database that match the direction-based hash; and
matching the sub-volumes against the query image features to find a match.

2. The method according to claim 1, wherein the feature is a strongest feature of the visual features.

3. The method according to claim 1, further comprising determining a location data relating to the query image based on the match, and outputting the location data.

4. The method according to claim 1, wherein if a match is not found, the method further comprises setting a neighboring viewing direction of the viewing direction to be the viewing direction.

5. The method according to claim 1, wherein generating the direction-based hash comprises:
determining a quality metric for each feature within the viewing direction;
determining a strongest feature in the viewing direction by means of determined quality metrics;
generating a hash for the strongest feature; and
combining the hash with said the direction to generate the direction-based hash.

6. An apparatus comprising at least one processor, memory including computer program code, the memory and the computer program code configured to, with the at least one processor, cause the apparatus to perform at least the following:
receive a query image;
process the query image to obtain visual features;
determine a feature from the visual features obtained by processing the query image;
determine a viewing direction for the query image from a pre-determined set of viewing directions, wherein the viewing direction is predetermined viewing direction closest to an estimated viewing direction of the query image, and wherein the viewing direction of the query image is estimated based on sensor data;
generate a direction-based hash based on the feature in the query image and the viewing direction;
identify sub-volumes of a point cloud database that match the direction-based hash; and
match the sub-volumes against the query image features to find a match.

7. The apparatus according to claim 6, wherein the feature is a strongest feature of the visual features.

8. The apparatus according to claim 6, wherein the apparatus is further caused to determine a location data relating to the query image based on a match, and to output the location data.

9. The apparatus according to claim 6, wherein if a match is not found, the apparatus is further caused to set a neighboring viewing direction of the viewing direction to be the viewing direction.

10. The apparatus according to claim 6, wherein, to generate the direction-based hash, the apparatus is further caused to:
  determine a quality metric for each feature within the viewing direction;
  determine a strongest feature in said viewing direction by means of determined quality metrics;
  generate a hash for the strongest feature; and
  combine the hash with the viewing direction to generate the direction-based hash.

11. A computer program product embodied on a non-transitory computer readable medium, comprising computer program code configured to, when executed on at least one processor, cause an apparatus or a system to:
  receive a query image;
  process the query image to obtain visual features;
  determine a feature from the visual features obtained by processing the query image;
  determine a viewing direction for the query image from a pre-determined set of viewing directions, wherein the viewing direction is predetermined viewing direction closest to an estimated viewing direction of the query image, and wherein the viewing direction of the query image is estimated based on sensor data;
  generate a direction-based hash based on the feature in the query image and the viewing direction;
  identify sub-volumes of a point cloud database that match the direction-based hash; and
  match the sub-volumes against the query image features to find a match.

12. The computer program product according to claim 11, wherein the feature is a strongest feature of the visual features.

13. The computer program product according to claim 11, wherein the apparatus or the system is further caused to determine a location data relating to the query image based on a match, and to output the location data.

14. The computer program product according to claim 11, wherein if a match is not found, the apparatus or the system is further caused to set a neighboring viewing direction of the viewing direction to be the viewing direction.

* * * * *